US012297661B2

(12) United States Patent
Cederblad et al.

(10) Patent No.: US 12,297,661 B2
(45) Date of Patent: May 13, 2025

(54) MAGNET IN BOLT

(71) Applicant: ASSA ABLOY AB, Stockholm (SE)

(72) Inventors: Mats Cederblad, Sigtuna (SE); Tomas Jonsson, Rönninge (SE); Per Mackegård, Solna (SE); Stefan Johansson, Stockholm (SE)

(73) Assignee: ASSA ABLOY AB, Stockholm (SE)

( * ) Notice: Subject to any disclaimer, the term of this patent is extended or adjusted under 35 U.S.C. 154(b) by 470 days.

(21) Appl. No.: 17/619,983

(22) PCT Filed: Jun. 16, 2020

(86) PCT No.: PCT/EP2020/066630
§ 371 (c)(1),
(2) Date: Dec. 16, 2021

(87) PCT Pub. No.: WO2020/254324
PCT Pub. Date: Dec. 24, 2020

(65) Prior Publication Data

US 2022/0298828 A1 Sep. 22, 2022

(30) Foreign Application Priority Data

Jun. 19, 2019 (EP) .................................... 19181340

(51) Int. Cl.
*E05B 47/00* (2006.01)
*E05B 45/08* (2006.01)

(52) U.S. Cl.
CPC ........ *E05B 47/0038* (2013.01); *E05B 45/083* (2013.01); *E05B 2047/0067* (2013.01); *E05B 2047/0095* (2013.01)

(58) Field of Classification Search
CPC .... E05B 47/0038; E05B 47/00; E05B 45/083; E05B 2047/0067; E05B 2047/0095;
(Continued)

(56) References Cited

U.S. PATENT DOCUMENTS 2,272,241 A * 2/1942 Fendring ............. E05B 15/0205 292/340
3,095,021 A * 6/1963 Schlage .................... B27F 5/12 30/167.1
(Continued)

FOREIGN PATENT DOCUMENTS

CA 2957856 A1 * 8/2018 ............. E05B 17/22
CA 2949071 C * 5/2020 ............... E06B 7/28
(Continued)

OTHER PUBLICATIONS

Design and fabrication of an innovative three-axis Hall sensor, Jan. 1, 2016, by Wouters et al., https://www.sciencedirect.com/science/article/pii/S0924424715302363 (Year: 2016).*
(Continued)

*Primary Examiner* — Gilbert Y Lee
*Assistant Examiner* — Steven A Tullia
(74) *Attorney, Agent, or Firm* — Schwegman Lundberg & Woessner, P.A.

(57) ABSTRACT

It is provided a lock assembly comprising: a striking plate assembly comprising an aperture and a magnetometer arranged in proximity of the aperture; a bolt being displaceable to enable movement through the aperture of the striking plate assembly, the bolt comprising a magnet; and a sensor device for detecting proximate presence of an object, wherein the sensor device is configured to power up the magnetometer when the sensor device detects proximate presence of an object; wherein the lock assembly is configured to detect, using the magnetometer and magnet when the bolt is in a protruded position through the aperture.

12 Claims, 2 Drawing Sheets

(58) Field of Classification Search
CPC ........... E05B 2047/0069; E05B 63/146; E05B 2045/0665; E05B 81/64
See application file for complete search history.

(56) References Cited

U.S. PATENT DOCUMENTS

| | | | | | |
|---|---|---|---|---|---|
| 4,186,954 | A * | 2/1980 | Detlefs | E05B 15/0205 D8/344 |
| 4,550,939 | A * | 11/1985 | Babb, Jr. | E05B 15/0205 D8/344 |
| 4,904,005 | A * | 2/1990 | Frolov | E05B 45/06 292/144 |
| 5,029,912 | A * | 7/1991 | Gotanda | E05B 47/0046 292/144 |
| 5,925,861 | A * | 7/1999 | Fromberg | E05B 15/1621 200/61.67 |
| 6,115,229 | A * | 9/2000 | Ahlig | H03K 17/9547 361/179 |
| D461,700 | S * | 8/2002 | Meredith | D8/344 |
| 9,631,920 | B2 * | 4/2017 | Goldenson | G01D 5/14 |
| 9,786,139 | B2 * | 10/2017 | Lamb | G08B 13/08 |
| 9,822,553 | B1 * | 11/2017 | Ho | E05B 47/026 |
| 10,227,818 | B2 * | 3/2019 | Kincaid | E06B 7/28 |
| 10,280,648 | B2 * | 5/2019 | Goldenson | E05B 45/083 |
| 10,393,554 | B2 * | 8/2019 | Campero | G08B 13/08 |
| 10,435,917 | B2 * | 10/2019 | Nunez | E05B 47/0038 |
| 10,845,437 | B2 * | 11/2020 | Long | E06B 7/28 |
| 11,280,927 | B2 * | 3/2022 | Amir | G08B 13/08 |
| 11,527,121 | B2 * | 12/2022 | Johnson | G07C 9/00571 |
| 2007/0069894 | A1 * | 3/2007 | Lee | E05B 45/06 340/542 |
| 2008/0012359 | A1 * | 1/2008 | Aschieri | E05C 19/163 292/251.5 |
| 2009/0066320 | A1 * | 3/2009 | Posey | H01H 3/166 324/207.13 |
| 2012/0167646 | A1 * | 7/2012 | Sharma | G01N 21/25 356/399 |
| 2012/0299314 | A1 * | 11/2012 | Jiang | E05B 45/083 292/137 |
| 2015/0330140 | A1 | 11/2015 | Kincaid et al. | |
| 2015/0348385 | A1 * | 12/2015 | Lamb | G08B 29/20 340/547 |
| 2017/0038005 | A1 * | 2/2017 | Kraus | E05B 65/06 |
| 2017/0098356 | A1 * | 4/2017 | Dai | G01R 33/02 |
| 2017/0362856 | A1 * | 12/2017 | Almomani | E05B 47/00 |
| 2018/0038159 | A1 | 2/2018 | Kincaid et al. | |
| 2018/0155959 | A1 * | 6/2018 | Hartung | E05B 17/10 |
| 2018/0340352 | A1 * | 11/2018 | Compton | E05B 47/0046 |
| 2018/0365943 | A1 * | 12/2018 | DiPoala | G08B 29/046 |
| 2019/0301199 | A1 * | 10/2019 | Andersen | E05B 47/0011 |
| 2020/0080342 | A1 * | 3/2020 | Li | E05B 47/0046 |
| 2022/0058904 | A1 * | 2/2022 | Ross | E05B 47/0046 |
| 2022/0298828 | A1 * | 9/2022 | Cederblad | E05B 47/00 |
| 2023/0203841 | A1 * | 6/2023 | Almomani | E05B 15/0205 292/137 |

FOREIGN PATENT DOCUMENTS

| | | | | |
|---|---|---|---|---|
| CN | 108475459 | | 8/2018 | |
| DE | 3702835 | C1 * | 1/1908 | G08B 13/08 |
| DE | 4012253 | | 4/1991 | |
| DE | 19633628 | | 2/1998 | |
| EP | 0600795 | | 6/1994 | |
| EP | 1340869 | A2 * | 9/2003 | E05B 45/06 |
| EP | 2877658 | | 6/2015 | |
| EP | 3128220 | | 2/2017 | |
| FR | 3102787 | A1 * | 5/2021 | E05B 17/22 |
| WO | WO-9708668 | A1 * | 3/1997 | E05B 65/1053 |
| WO | WO 2011/019406 | | 2/2011 | |
| WO | WO-2011041830 | A1 * | 4/2011 | E05B 1/00 |
| WO | WO-2012092492 | A2 * | 7/2012 | E05B 17/22 |
| WO | WO 2014/016281 | | 1/2014 | |
| WO | WO-2014154738 | A1 * | 10/2014 | E05B 39/00 |
| WO | WO-2016066422 | A1 * | 5/2016 | A47B 88/00 |
| WO | WO 2017/218612 | | 12/2017 | |
| WO | WO-2017218612 | A1 * | 12/2017 | E05B 15/0205 |
| WO | WO-2019121715 | A1 * | 6/2019 | E05B 45/083 |

OTHER PUBLICATIONS

Extended Search Report for European Patent Application No. 19181340.1, dated Nov. 28, 2019, 6 pages.

International Search Report and Written Opinion for International (PCT) Patent Application No. PCT/EP2020/066630, dated Sep. 9, 2020, 14 pages.

International Preliminary Report on Patentability for International (PCT) Patent Application No. PCT/EP2020/066630, dated Dec. 30, 2021, 8 pages.

Official Action with English Translation for China Patent Application No. 202080043939.X, dated Aug. 3, 2022, 14 pages.

Official Action with English Translation for China Patent Application No. 202080043939.X, dated May 7, 2022, 16 pages.

* cited by examiner

MAGNET IN BOLT

CROSS REFERENCE TO RELATED APPLICATIONS

This application is a national stage application under 35 U.S.C. 371 and claims the benefit of PCT Application No. PCT/EP2020/066630 having an international filing date of Jun. 16, 2020, which designated the United States, which PCT application claimed the benefit of Europe patent application Ser. No. 19/181,340.1 filed Jun. 19, 2019, the disclosure of each of which are incorporated herein by reference.

TECHNICAL FIELD

The present disclosure relates to the field of locks and in particular to a lock assembly where a bolt comprises a magnet for validity verification.

BACKGROUND

Locks and keys are evolving from the traditional pure mechanical locks. These days, electronic locks are becoming increasingly common. For electronic locks, electronic keys are used for authentication of a user. The electronic keys and electronic locks can communicate either over a wireless interface or a conductive interface. Such electronic locks and keys provide a number of benefits, including improved flexibility in management of access rights, audit trails, key management, etc.

In electronic locks, information of a status of a barrier (such as a door or a window) is often beneficial, whereby one or more sensors can be provided to detect the status of a locking bolt. For instance, a user can in this way ensure that a particular lock is in a locked state, e.g. when leaving the premises. There can e.g. be one sensor that detects if a barrier is open or closed. A further sensor can detect that a locking bolt protrudes through a striking plate.

An attacker can tamper with such a system by inserting a loose locking bolt or other material in the corresponding aperture of the striking plate. In this way, the system (and thus the user) may consider the door or window to be locked, even though this is not the case. This can erroneously be interpreted as a physical space having been locked and secured, while, in fact, the actual door or window is unlocked and open.

SUMMARY

One objective is to, in a power efficient manner, reduce the risk of an attacker tampering with a lock assembly such that it considers a lock to be secured when it is not.

According to a first aspect, it is provided a lock assembly comprising: a striking plate assembly comprising an aperture and a magnetometer arranged in proximity of the aperture; a bolt being displaceable to enable movement through the aperture of the striking plate assembly, the bolt comprising a magnet; and a sensor device for detecting proximate presence of an object, wherein the sensor device is configured to power up the magnetometer when the sensor device detects proximate presence of an object; wherein the lock assembly is configured to detect, using the magnetometer and magnet when the bolt is in a protruded position through the aperture.

The bolt may be a locking bolt.

The bolt may be a latch bolt.

The lock assembly may be configured to only consider the bolt to be in a secured state when the magnetic field detected by the magnetometer is determined to be valid.

The lock assembly may be configured to consider the magnetic field detected by the magnetometer is determined to be valid when the magnetic field has a valid strength.

The magnetometer may be a three-axis magnetometer.

The lock assembly may be configured to consider the magnetic field detected by the magnetometer to be valid when the magnetic field has a valid direction.

The lock assembly may be configured to detect when the magnetic field is valid based on a sliding window function of previously detected magnetic field measurements.

According to a second aspect, it is provided a method, performed by a lock assembly comprising a striking plate assembly and a bolt being displaceable to enable movement through an aperture of the striking plate assembly. The method comprises the steps of: powering up the magnetometer when the lock assembly detects, using a sensor device of the striking plate assembly proximate presence of an object; and detecting, using a magnetometer of the striking plate assembly and a magnet of the bolt, when the bolt is in a protruded position through the aperture.

The method may further comprise the step of: considering the bolt to be in a secured state only when the magnetic field detected by the magnetometer is determined to be valid.

The magnetometer may be a three-axis magnetometer.

According to a third aspect, it is provided a computer program comprising computer program code which, when run on a lock assembly comprising a striking plate assembly and a bolt being displaceable to enable movement through an aperture of the striking plate assembly, causes the lock assembly to: power up the magnetometer when the lock assembly detects, using a sensor device of the striking plate assembly proximate presence of an object; and detect, using a magnetometer of the striking plate assembly and a magnet of the bolt, when the bolt is in a protruded position through the aperture.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
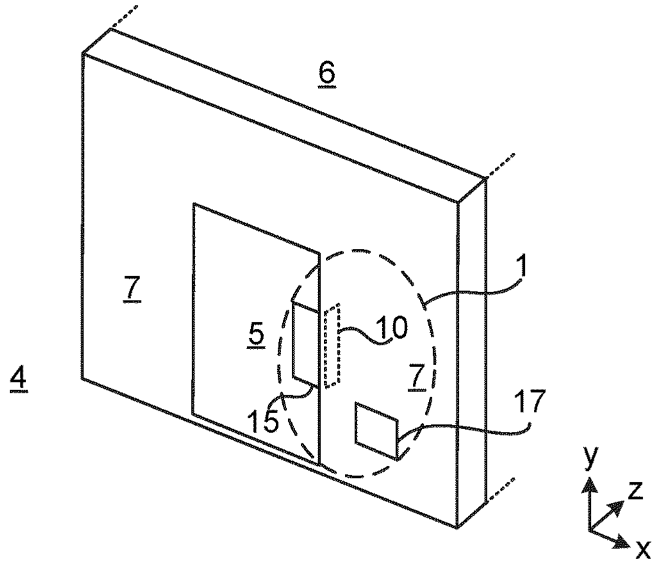
FIG. 1 is a schematic diagram showing an environment in which embodiments presented herein can be applied.

FIG. 1 is a schematic diagram showing an environment in which embodiments presented herein can be applied. Access to a physical space 6 is restricted by a physical barrier 5 which is selectively controlled to be in a locked state or an unlocked state. The physical barrier 5 can be a door, window, gate, hatch, cabinet door, drawer, etc. The physical barrier 5 is provided in a surrounding physical structure 7 (being a wall, fence, ceiling, floor, etc.) and is provided between the restricted physical space 6 and an accessible physical space 4. It is to be noted that the accessible physical space 4 can be a restricted physical space in itself, but in relation to this physical barrier 5, the accessible physical space 4 is accessible.

A lock assembly 1 is provided to secure the physical space 6. The lock assembly 1 comprises a striking plate assembly 10 and a lock section 15. One of the striking plate assembly 10 and the lock section 15 is provided in the barrier 5 and the other is provided in the surrounding structure 7 (as shown) or in an opposing door in a double door pair (not shown). For instance, the lock section 15 can be provided in the barrier 5 and the striking plate assembly 10 can be provided in the surrounding structure 7, as shown in FIG. 1, or vice versa.

Figure 2:
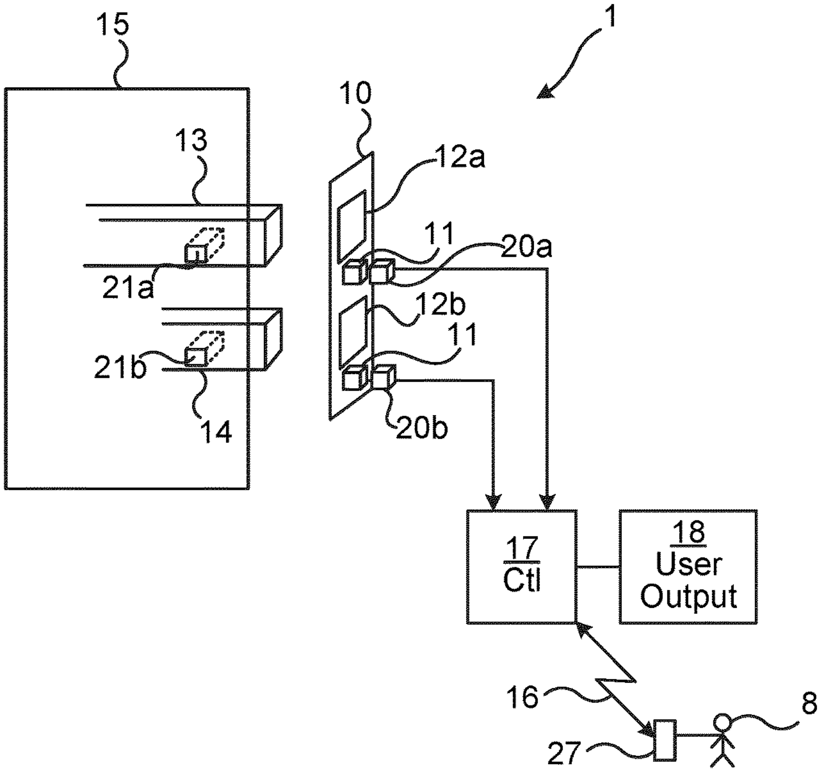
FIG. 2 is a schematic diagram illustrating one embodiment of the lock assembly of FIG. 1.

The lock section 15 comprises one or more bolts (shown in FIG. 2). The bolt(s) are displaceable (linearly or otherwise) to enable movement through a corresponding one aperture of the striking plate assembly, whereby the bolt is engaged with the striking plate and the barrier is secured. The bolt can e.g. be in the form of a locking bolt and/or a latch bolt.

In one embodiment, the lock assembly 1 is an electronic lock. In order to unlock the barrier 5, a controller 17 is then provided. The controller 17 forms part of the lock assembly 1, which is controllable by the controller 17 to be set in an unlocked state or locked state. Alternatively, the lock is a mechanical lock, for which the locked/unlocked state is desired to be monitored.

FIG. 2 is a schematic diagram illustrating one embodiment of a lock assembly 1. The striking plate assembly 10 comprises a striking plate and at least one sensor device 11. The sensor device 11 is provided for detecting proximate presence of the bolt. In the embodiment shown in FIG. 2, there are two sensor devices 11, one for each bolt 13, 14. The striking plate can be made of metal and secures the position of the bolt(s) (locking bolt 13 and/or latch bolt 14) when extended through apertures 12*a-b* in the striking plate into the surrounding structure 7, thus making it difficult for an attacker to break open the barrier.

The striking plate assembly 10 further comprises at least one magnetometer 20*a*, 20*b*. In this example, there are two magnetometers 20*a*, 20*b*, one for each aperture 12*a-b* and corresponding bolt 13, 14.

Each bolt 13, 14 comprises a magnet 21*a*, 21*b*. The magnets can be permanent magnets, e.g. neodymium magnets or ferrite magnets. Each set of magnet and magnetometer are configured such that the magnetometer can detect the presence of the corresponding magnet. As explained in more detail below, this detection is used for determining if the object provided through the aperture is valid.

Optionally, there are two bolts 13, 14, but only one magnetometer to detect the magnets 21*a*, 21*b* on the bolts 13, 14. The magnets and magnetometer is then configured to distinguish between the two different magnets 21*a*, 21*b*. The two magnets 21*a*, 21*b* can be mounted such that their directions of magnetic field differ. For instance, the magnet two magnets 21*a*, 21*b* can be mounted such that their directions of magnetic field are perpendicular to each other. By using only one magnetometer for two bolts, energy is saved, as well as component cost.

The striking plate assembly 10 is for use with a lock section 15 which comprises one or more bolts 13, 14 in the form of a locking bolt 13 and/or a latch bolt 14. The striking plate 10 comprises a first bolt aperture 12*a* through which the locking bolt 13 can pass. When the locking bolt 13 passes through the first bolt aperture 12*a*, the lock section 15 is in a locked state.

The sensor device 11 of the striking plate assembly 10 may further comprise a proximity sensor, also used for detecting a status of the locking bolt 13. The proximity sensor is only used to detect the presence of an object. In other words, the sensor device is used for detecting proximate presence of an object. The sensor device 11 consumes less power than the magnetometer(s) 20*a*, 20*b*. The sensor device is configured to power up the magnetometer(s) 20*a*, 20*b* when the sensor device detects proximate presence of an object, which reduces power requirements. In other words, the sensor device 11 controls the powering up of the magnetometer(s) 20*a*, 20*b*.

Unlike the magnetometer, the proximity sensor does not need to be used for determining validity of the bolt. The proximity sensor is then used together with the magnetometer to determine the status of the locking bolt. The status is either that the valid bolt has been extended through the aperture of the striking plate or that the valid locking bolt is not extended through the striking plate. When applied for the locking bolt 13, when this is extended through the striking plate, this indicates that the lock is in a locked state. Another status is that an invalid bolt is provided in proximity of the proximity sensor, indicating a tampering attempt or an innocent misuse. When the valid bolt is extended through the striking plate, it can also be deduced that the barrier is closed, removing the need for a separate sensor to detect when the barrier is closed. Conversely, when the locking bolt 13 is not extended through the striking plate, the lock is in unlocked state. The sensor device 11 is provided attached to the striking plate 10, such that its proximity sensor is located adjacent to where the locking bolt 13 is intended to pass.

The proximity sensor of the sensor device 11 can be based on any one or more of electrical capacity, electrical inductivity, infrared light, magnetism (e.g. a hall sensor), photocell, sonar, mechanical switch etc. When the proximity sensor is an inductive sensor, this simplifies retrofitting, since a regular metal locking bolt presence can be detected with an inductive sensor. The sensor device 11 can be a self-contained device comprising the proximity sensor, battery, antenna(s), and control circuitry. Such a sensor device 11 is easy to integrate in the striking plate and can be replaced or upgraded when needed.

A controller 17 can be connected to the magnetometer(s) 20*a*, 20*b* and sensor device(s) 11. The interface between the controller 17 and the magnetometer(s) and sensor device 11 can be implemented using a wireless interface or a wire-based interface. The wireless interface can e.g. be implemented using Bluetooth, Bluetooth Low Energy (BLE), any of the IEEE 802.15 standards, Radio Frequency Identification (RFID), any of the IEEE 802.11 standards, wireless USB (Universal Serial Bus), etc. The wire-based interface can e.g. be implemented using USB, Ethernet, serial connection (e.g. RS-485), etc.

Moreover, the controller 17 can comprise a user credential interface 16 for communicating with a user credential 27. The user credential interface 16 can be implemented using any suitable wireless interface, e.g. using Bluetooth, BLE, any of the IEEE 802.15 standards, RFID, Near Field Communication (NFC), any of the IEEE 802. 11 standards, wireless USB, etc. Alternatively or additionally, the user credential interface 16 can be implemented using wire-based communication, e.g. using USB, Ethernet, serial connection (e.g. RS-485), etc.

Optionally, the controller 17 is provided with a way to communicate with a remote control device (not shown), such as a smart phone, computer etc. for remote lock management. Using the remote communication, the controller 17 is remotely controllable, e.g. to allow access for a particular user credential or to remotely unlock the lock (e.g. for a tradesman, cleaner, child who have lost a key, etc.). Also, the remote communication enables event monitoring, e.g. of unlocking status, locking status, opening, closing, etc., which can be detected using the sensor device and communication modules. It is of particular importance that the lock status can be relied upon when the remote control interface is provided.

The user credential 27 can be implemented using any suitable device portable by a user and which can be used for authentication over the credential interface 16. The user credential 27 is typically carried or worn by the user 8 and may be implemented as a mobile phone, a smartphone, a key fob, wearable device, smart phone case, access card, electronic physical key, etc.

Using the user credential interface 16, the authenticity of the user credential 27 can be checked by the controller 17 in an access control procedure, e.g. using a challenge and response scheme. The authorisation to open the lock assembly 1 is then checked, either by the controller 17 itself, or by communicating with an external (local or remote) authorisation device (not shown) to reach an access decision whether to grant or deny access.

The controller 17 also receives sensor data from the sensor device 11 indicating the presence or absence of a locking bolt 13. Presence of the locking bolt 13 indicates an extended locking bolt 13, corresponding to a locked state, and absence of the locking bolt 13 indicates a retracted locking bolt 13, corresponding to an unlocked state. Significantly, the validity of the bolt is also used by the controller 17. For instance, the controller 17 can be configured to only consider the bolt to be in a secured state when the magnetic field detected by the magnetometer is determined to be valid. In this way, a loose bolt cannot be inserted in the striking plate to tamper with the lock assembly into considering the lock to be in a locked state, unless the loose piece of metal provides a valid magnetic field, which is not trivial. The detected magnetic field is considered to be valid when it is within an expected strength and/or direction. The expected strength and/or direction can be set at installation. For instance, the lock assembly can be set in a start-up mode, where the bolt is provided in a protruded state, allowing the magnetometer to set the expected magnetic field. Alternatively, any reading of a magnetic field greater than a threshold magnitude is fed into a sliding window function (or other low-pass filter function). In this way, slow, long-term changes in magnetic field do not affect the ability to correctly identify the presence of the valid magnet. When a detected magnetic field differs from the function value more than a threshold amount, the lock assembly determines that no valid bolt is provided in the proximity of the magnetometer. In other words, not only would an attacker need to provide a loose bolt with a magnetic field to tamper with the lock assembly, the loose bolt must also be valid in terms of field strength and/or direction, making it extremely difficult for an attacker to tamper with the lock assembly in this way.

The controller 17 is configured to selectively control the lock assembly 1 based on the validity of the bolt and sensor data received from the sensor device 11, as well as user credential data received over the credential interface 16.

Using the access decision, the bolt validity as well as the sensor data, the controller 17 determines whether to retract or extend the locking bolt 13 by sending an appropriate control signal to the lock assembly 1.

Optionally, the striking plate assembly 10 further comprises a second sensor device 11 for detecting a status of a separate latch bolt 14 of the lock assembly 1 to gain better information about the status of the door. When the latch bolt 14 is present, this indicates that the barrier 5 is closed. Conversely, when the latch bolt 14 is absent, this indicates that the barrier is open. Again, the validity of the bolt, i.e. latch bolt 14 here, is checked and the latch bolt is only considered to be provided through the corresponding aperture 12*b* when its validity is verified. Hence, the presence or absence of the latch bolt 14 in a second bolt aperture 12*b* of the striking plate 10, as detected by the second sensor device 11 and transmitted as sensor data to the controller 17, can be interpreted as whether the barrier 5 is open (when the latch bolt 14 is absent) or closed (when the latch bolt 14 is present).

A user output device 18 can also be provided, connected to the controller 17. The user output device 18 can be any one or more of a LED (light emitting diode), lamp, beeper, sound device, display, etc. The controller 17 is then configured to provide user feedback via the user output device 18. For instance, the user feedback can be used to indicate any of the following situations: access granted, access denied, access granted but no change (e.g. if the barrier is already open), etc. When the controller 17 is remotely controllable, the user output can optionally be provided in parallel to a device performing the remote control. For instance, if a user remotely unlocks the door for a tradesman, the successful unlocking can result in a green LED indicating that the door is unlocked to the tradesman, as well as an indicator on the user interface of the remote control device.

With the solution presented herein, it becomes extremely difficult for an attacker to tamper with the lock assembly such that it determines that a valid bolt is present by inserting a loose bolt or other item into an aperture of the striking plate.

Figure 3:
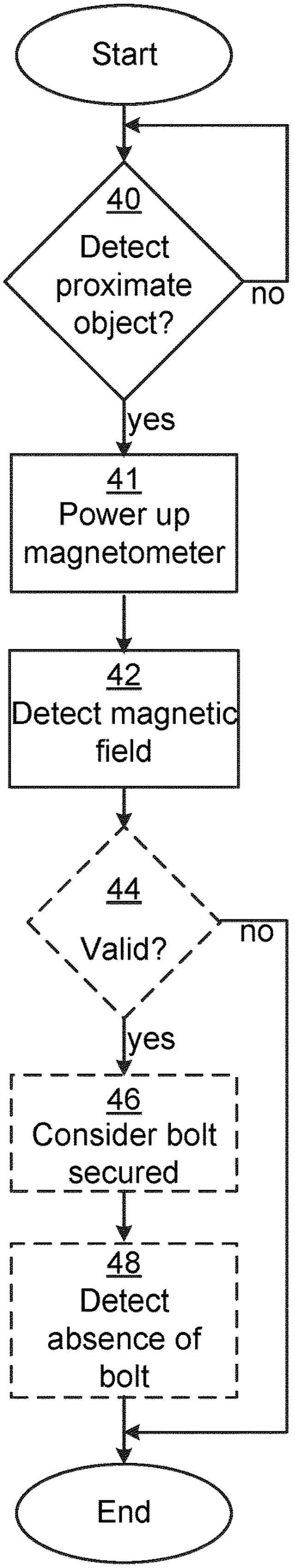
FIG. 3 is a flow chart illustrating embodiments of methods for determining validity of a bolt.

FIG. 3 is a flow chart illustrating embodiments of methods for determining validity of a bolt. As explained above, the method is performed in a lock assembly comprising a striking plate assembly and a bolt being displaceable to enable movement through an aperture of the striking plate assembly. The method can be applied for either or both of the bolt being a locking bolt or a latch bolt. The magnetometer can be a three-axis magnetometer.

In a conditional detect proximate object step 40, the lock assembly detects, using a sensor device of the striking plate assembly when there is a proximate presence of an object. If this is the case, the method proceeds to a power up magnetometer step 41. Otherwise, this step is repeated, optionally after an idle period.

In the power up magnetometer step 41, the lock assembly powers up the magnetometer. By only powering up the magnetometer when a proximate object is detected, the lock assembly is made more power efficient. The magnetometer can consume significant amounts of power and by only powering the magnetometer when there is an object nearby, the magnetometer does not need to be constantly powered, regardless whether true continuously powered or on a schedule.

In a detect magnetic field step 42, the lock assembly detects, using a magnetometer of the striking plate assembly and a magnet of the bolt, when the bolt is in a protruded position through the aperture.

In an optional conditional valid step 44 the lock assembly determines when the magnetic field detected by the magnetometer is determined to be valid. When this is the case, the method proceeds to an optional consider bolt secured step 46. Otherwise, the method ends.

In the optional consider bolt secured step 46, the lock assembly considers the bolt to be in a secured state.

In an optional detect absence of bolt step 48, the lock assembly detects when the bolt has been retracted. This can be detected by a proximity sensor in the lock device. The proximity sensor can be made more energy efficient than the communication module, whereby polling of presence with the proximity sensor uses less energy or can occur more often than with the communication module. When the bolt is retracted when not expected to occur, this can indicate that a break-in is in progress.

Figure 4:
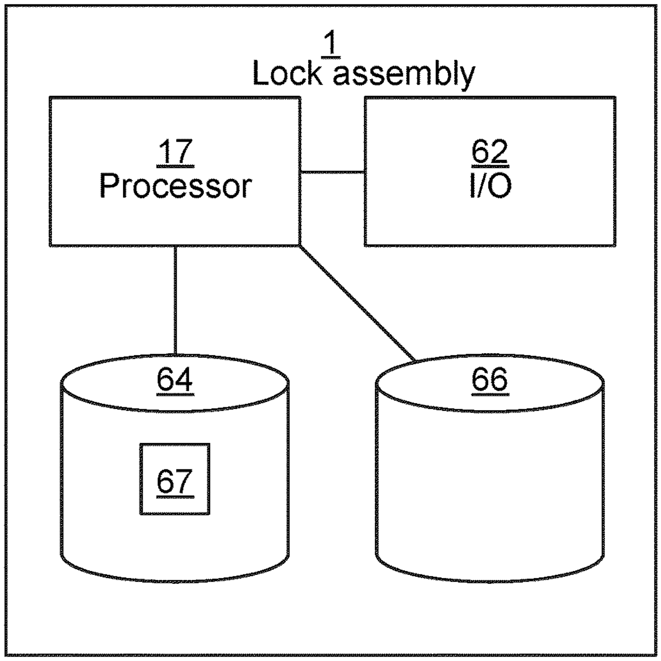
FIG. 4 is a schematic diagram illustrating components of the lock assembly of FIG. 1 and FIG. 2.

FIG. 4 is a schematic diagram illustrating components of the lock assembly of FIG. 1 and FIG. 2. A processor 17 is provided using any combination of one or more of a suitable central processing unit (CPU), multiprocessor, microcontroller, digital signal processor (DSP), etc., capable of executing software instructions 67 stored in a memory 64, which can thus be a computer program product. The processor 17 could alternatively be implemented using an application specific integrated circuit (ASIC), field programmable gate array (FPGA), etc. The processor 17 can be configured to execute the method described with reference to FIG. 3 above.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 17. The data memory 66 can be any combination of RAM and/or ROM.

The lock assembly 1 further comprises an I/O interface 62 for communicating with external and/or internal entities. For instance, the I/O interface 62 comprises components for communicating internally to the sensor device 11 and the magnetometer 20_a_, 20_b_. The I/O interface 62 also comprises the optional user output device 18 and the user credential interface 16.

Other components of the lock assembly 1 are omitted in order not to obscure the concepts presented herein.

Figure 5:
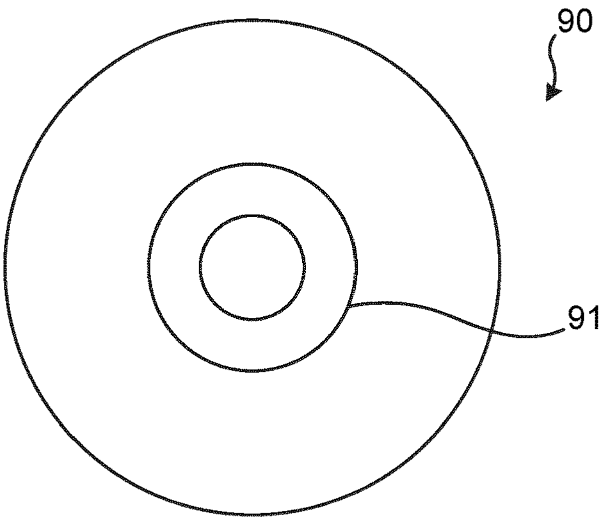
FIG. 5 shows one example of a computer program product 90 comprising computer readable means.

FIG. 5 shows one example of a computer program product 90 comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 4. While the computer program 91 is here schematically shown as a track on the depicted optical disk, the computer program can be stored in any way which is suitable for the computer program product, such as a removable solid-state memory, e.g. a Universal Serial Bus (USB) drive.

Here now follows a list of embodiments from another perspective, enumerated with roman numerals.

i. A lock assembly comprising:

a striking plate assembly comprising an aperture and a magnetometer arranged in proximity of the aperture; and a bolt being displaceable to enable movement through the aperture of the striking plate assembly, the bolt comprising a magnet;

wherein the lock assembly is configured to detect, using the magnetometer and magnet when the bolt is in a protruded position through the aperture.

ii. The lock assembly according to embodiment i, wherein the bolt is a locking bolt.

iii. The lock assembly according to embodiment i, wherein the bolt is a latch bolt.

iv. The lock assembly according to any one of the preceding embodiments, wherein the striking plate assembly further comprises a sensor device for detecting proximate presence of an object and wherein the sensor device is configured to power up the magnetometer when the sensor device detects proximate presence of an object.

v. The lock assembly according to any one of the preceding embodiments, wherein the lock assembly is configured to only consider the bolt to be in a secured state when the magnetic field detected by the magnetometer is determined to be valid.

vi. The lock assembly according to embodiment v, wherein the lock assembly is configured to consider the magnetic field detected by the magnetometer is determined to be valid when the magnetic field has a valid strength.

vii. The lock assembly according to any one of the preceding embodiments, wherein the magnetometer is a three-axis magnetometer.

viii. The lock assembly according to embodiment vii, wherein the lock assembly is configured to consider the magnetic field detected by the magnetometer to be valid when the magnetic field has a valid direction.

ix. The lock assembly according to any one of embodiments v, vi, or viii, wherein the lock assembly is configured to detect when the magnetic field is valid based on a sliding window function of previously detected magnetic field measurements.

x. A method, performed in a lock assembly comprising a striking plate assembly and a bolt being displaceable to enable movement through an aperture of the striking plate assembly, the method comprising the step of:

detecting, using a magnetometer of the striking plate assembly and a magnet of the bolt, when the bolt is in a protruded position through the aperture.

xi. The method according to embodiment x, further comprising the step of:

powering up the magnetometer when the lock assembly detects, using a sensor device of the striking plate assembly proximate presence of an object.

xii. The method according to embodiment x or xi, further comprising the step of:

considering the bolt to be in a secured state only when the magnetic field detected by the magnetometer is determined to be valid.

xiii. The method according to any one of embodiments x to xii, wherein the magnetometer is a three-axis magnetometer.

xiv. A computer program comprising computer program code which, when run on a lock assembly comprising a striking plate assembly and a bolt being displaceable to enable movement through an aperture of the striking plate assembly causes the lock assembly to:

detect, using a magnetometer of the striking plate assembly and a magnet of the bolt, when the bolt is in a protruded position through the aperture.

xv. A computer program product comprising a computer program according to embodiment xiv and a computer readable means on which the computer program is stored.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A lock assembly comprising:

a striking plate assembly comprising an aperture and a magnetometer arranged in proximity of the aperture;

a bolt being displaceable to enable movement through the aperture of the striking plate assembly, the bolt comprising a magnet; and a sensor device comprising a proximity sensor for detecting proximate presence of an object, wherein the proximity sensor is separate from the magnetometer, and wherein the sensor device is configured to power up the magnetometer based on the sensor device detecting proximate presence of an object;

wherein the lock assembly is configured to detect, using the magnetometer and magnet, when the bolt is in a protruded position through the aperture.

2. The lock assembly according to claim 1, wherein the bolt is a locking bolt.

3. The lock assembly according to claim 1, wherein the bolt is a latch bolt.

4. The lock assembly according to claim 1, wherein the lock assembly is configured to only consider the bolt to be in a secured state when the magnetic field detected by the magnetometer is determined to be valid.

5. The lock assembly according to claim 4, wherein the lock assembly is configured to consider the magnetic field detected by the magnetometer to be valid when the magnetic field has a valid strength.

6. The lock assembly according to claim 4, wherein the lock assembly is configured to detect when the magnetic field is valid based on a sliding window function of previously detected magnetic field measurements.

7. The lock assembly according to claim 1, wherein the magnetometer is a three-axis magnetometer.

8. The lock assembly according to claim 7, wherein the lock assembly is configured to consider the magnetic field detected by the magnetometer to be valid when the magnetic field has a valid direction.

9. A method, performed by a lock assembly comprising a striking plate assembly and a bolt being displaceable to enable movement through an aperture of the striking plate assembly, the method comprising:

powering up a magnetometer of the striking plate assembly based on the lock assembly detecting, using a proximity sensor of a sensor device of the striking plate assembly, proximate presence of an object, wherein the proximity sensor is separate from the magnetometer; and detecting, using the magnetometer and a magnet of the bolt, when the bolt is in a protruded position through the aperture.

10. The method according to claim 9, further comprising:

considering the bolt to be in a secured state only when the magnetic field detected by the magnetometer is determined to be valid.

11. The method according to claim 9, wherein the magnetometer is a three-axis magnetometer.

12. A non-transitory computer readable medium comprising computer program code which, when run on a lock assembly comprising a striking plate assembly and a bolt being displaceable to enable movement through an aperture of the striking plate assembly, causes the lock assembly to:

power up a magnetometer of the striking plate assembly based on the lock assembly detecting, using a proximity sensor of a sensor device of the striking plate assembly, proximate presence of an object, wherein the proximity sensor is separate from the magnetometer; and detect, using the magnetometer and a magnet of the bolt, when the bolt is in a protruded position through the aperture.

* * * * *